United States Patent Office 3,198,642
Patented Aug. 3, 1965

3,198,642
GLASS COMPOSITIONS
Erwin C. Hagedorn, Oregon, Ohio, assignor to Owens-Illinois Glass Company, a corporation of Ohio
No Drawing. Filed July 9, 1962, Ser. No. 208,625
6 Claims. (Cl. 106—54)

This invention relates to new glass compositions. More specifically, the invention relates to glasses containing silica, alumina, boron trioxide, and rubidium oxide.

In the new field of fiber optics, a glass rod is enclosed in a glass tube of a different composition. A bundle of such rod and tube combinations are assembled, heated and pulled together to draw fine rods incased in tubings. The working temperature during the drawing is sufficient that the tubings fuse together to form a composite comprising a matrix formed from the glass of the original rods encompassing a myriad of fine glass fibers in substantially parallel orientation. The fine glass fibers are the light carrying medium, and, as is well understood, their refractive index must be well above the refractive index of the rod or matrix glass. The glass of the rods, or fibers, will usually have a refractive index of at least 1.54. The glass of the tubing, that is, the matrix glass should have an index refraction of less than 1.50. Moreover, the fiber softening point of the tube or matrix glass is preferably lower than the fiber softening point of the rod glasss so that, during the drawing process, the rod glass can maintain its cross-sectional shape fairly accurately while the tubing glass fuses together to form the coherent matrix. Most glasses useful as the core or fiber glasses in fiber optics, that is, glasses having refractive indexes above 1.54, have fiber softening points of somewhat less than 1475° F. Therefore, the present glasses should have lower fiber softening points below this temperature. Most core glasses of such high refractive index also have coefficients of thermal expansion (0–300° C.) of no more than about $80 \times 10^{-7}$. The tubing glass should preferably have a coefficient of thermal expansion lower than that of the core glass, since otherwise the finished fibers can become distorted because of surface tension effects.

Another important requirement is that the glasses have a log 5 viscosity temperature above the liquidus of that glass, preferably at least 80° F. higher. The glass tubes are usually drawn at viscosities of log 5 or higher. If the liquidus is higher or the same as the drawing temperature, trouble with devitrification is usually encountered.

Therefore, to meet these requirements, it was necessary to develop a tubing glass that had a low index of refraction below 1.5, a relatively low viscosity, i.e., a fiber softening point below 1425° F., a low coefficient of thermal expansion below $80 \times 10^{-7}$, and a relatively low liquidus. These are difficult criteria to meet.

It is thus an object of the present invention to provide a glass composition meeting the foregoing requirements.

According to the present invention, there are provided glass compositions having a liquidus temperature of at least 80° F. below the temperature at which the $\log_{10}$ of the viscosity in poises is 5, an index of refraction, $N_d^{25}$, below 1.5, a fiber softening point below 1425° F., a coefficient of thermal expansion of less than $80 \times 10^{-7}$, and a composition consisting essentially of 35–50 weight percent $SiO_2$, 3–11 weight percent $Al_2O_3$, 22–38 weight percent $B_2O_3$ and 15–25 weight percent $Rb_2O$. More usually, the compositions are in the narrower range of from 38–48 weight percent $SiO_2$, 4–10 weight percent $Al_2O_3$, 24–37 weight percent $B_2O_3$ and 16–22 weight percent $Rb_2O$.

While alkali metal oxides in general are known to lower the fiber softening point and decrease the viscosity of silica-alumina-borate glasses, the common alkali metal oxides also greatly increase the coefficient of thermal expansion and the index of refraction of such glasses. I have now discovered that rubidium oxide added to silica-alumina-borates can produce glasses with a sufficiently low viscosity, coupled with a sufficiency low coefficient of thermal expansion and a suitable index of refraction, as well as having a suitable log 5 viscosity liquidus temperature relationship.

In the following examples of the invention, the liquidus determination was made by placing a powdered sample of the glass in a gradient furnace for three days.

The glasses of the following examples were all melted in a conventional manner using a furnace temperature of about 2750° F. and conventional raw materials (flint, anhydrous boric acid, rubidium carbonate and alumina). The examples are merely illustrative and should not be construed as limiting the invention.

*Example I*

This glass had a composition on analysis of 43 weight percent $SiO_2$, 9.6 weight percent $Al_2O_3$, 17.6 weight percent $Rb_2O$, and 29.4 weight percent $B_2O_3$. It had a liquidus below 950° F. and was very stable. Its log 5 viscosity temperature was 1750° F., and its fiber softening point (log 7.65) was 1246° F., while its index of refraction, $N_d^{25}$ was 1.471. Its coefficient of thermal expansion (0–300° C.) was $63 \times 10^{-7}$.

*Example II*

In this example the composition was 44.8 weight percent $SiO_2$, 9.6 weight percent $Al_2O_3$, 19.3 weight percent $Rb_2O$, and 26 weight percent $B_2O_3$. The liquidus was below 1000° F. and this glass was also very stable. Its index of refraction, $N_d^{25}$, was 1.4780, while its fiber softening point and its log 5 viscosity temperatures were, respectively, 1316° F. and 1790° F. The coefficient of thermal expansion of the glass (0–300° C.) was $70 \times 10^{-7}$.

*Example III*

The glass in this example had a composition of 40.3 weight percent $SiO_2$, 5.2 weight percent $Al_2O_3$, 18.8 weight percent $Rb_2O$, and 35.9 weight percent $B_2O_3$. Its index of refraction, $N_d^{25}$, was 1.478. Its fiber softening point and log 5, viscosity temperatures were, respectively, 1119° F. and 1460° F. while its liquidus was below 1050° F. The average coefficient of thermal expansion (0–300° C.) was $70 \times 10^{-7}$.

As an example of a suitable rod or core glass to use in combination with the tubing glass of this example, there can be mentioned a high refractive index glass of the following properties:

| | Weight percent |
|---|---|
| $SiO_2$ | 29.3 |
| $PbO$ | 61.7 |
| $BaO$ | 8.0 |

| | |
|---|---|
| F.S.P. ° F | 1126 |
| $N_d^{25}$ (approx.) | 1.75 |
| $\alpha$ (0–300° C.) $\times 10^7$ | 79 |

EXAMPLE IV

The glass of this example of the invention was melted from the raw materials earlier mentioned to have a theoretical composition of 40 weight percent $SiO_2$, 10 weight percent $Al_2O_3$, 30 weight percent $B_2O_3$ and 20 weight percent $Rb_2O$. Its index of refraction, $N_d^{25}$, was 1.477, while the coefficient of thermal expansion (0–300° C.) was $74 \times 10^{-7}$. This glass had a liquidus below 1650° F. and a fiber softening point of 1273° F.

The term "consisting essentially of" herein and in the claims means that the glasses contain the named ingredients only, or that they contain the named ingredients together with such amounts of other compatible inorganic constituents as do not materially change or affect the basic and novel characteristics of the glasses which are set forth in the appended claims, such characteristics being the stated log 5 viscosity-liquidus temperature relationship, and the stated fiber softening point, index of refraction and expansion characteristics. It will thus be understood that some amounts of other compatible glass-making ingredients can undoubtedly be included in the basic compositions set forth herein without departing from the spirit and scope of the invention, or the scope of the appended claims.

I claim:

1. A glass composition having a liquidus temperature of at least 80° F. below the temperature at which the $\log_{10}$ of the viscosity in poises is 5, an index of refraction, $N_d^{25}$, below 1.5, a fiber softening point below 1425° F., a coefficient of thermal expansion of less than $80 \times 10^{-7}$, and a composition consisting essentially of 35–50 weight percent $SiO_2$, 3–11 weight percent $Al_2O_3$, 22–38 weight percent $B_2O_3$, and 15–25 weight percent $Rb_2O$.

2. A glass composition having a liquidus temperature of at least 80° F. below the temperature at which the $\log_{10}$ of the viscosity in poises is 5, an index of refraction, $N_d^{25}$, below 1.5, a fiber softening point below 1425° F., a coefficient of thermal expansion of less than $80 \times 10^{-7}$, and a composition consisting essentially of 38–48 weight percent $SiO_2$, 4–10 weight percent $Al_2O_3$, 24–37 weight percent $B_2O_3$, and 16–22 weight percent $Rb_2O$.

3. A composition of claim 2 wherein the glass consists essentially of about 43 weight percent $SiO_2$, about 10 weight percent $Al_2O_3$, about 18 weight percent $Rb_2O$, and about 29 weight percent $B_2O_3$.

4. A composition of claim 2 wherein the glass consists essentially of about 45 weight percent $SiO_2$, about 10 weight percent $Al_2O_3$, about 19 weight percent $Rb_2O$, and about 26 weight percent $B_2O_3$.

5. A composition of claim 2 wherein the glass consists essentially of about 40 weight percent $SiO_2$, about 5 weight percent $Al_2O_3$, about 19 weight percent $Rb_2O$, and about 36 weight percent $B_2O_3$.

6. A composition of claim 2 wherein the glass consists essentially of about 40 weight percent $SiO_2$, about 10 weight percent $Al_2O_3$, about 20 weight percent $Rb_2O$, and about 30 weight percent $B_2O_3$.

References Cited by the Examiner

UNITED STATES PATENTS 2,964,414   12/60   Dalton et al. _____ 106—53

FOREIGN PATENTS 574,029   12/45   Great Britain.
627,442   8/49    Great Britain.
648,114   12/60   Great Britain.

OTHER REFERENCES

Kapany: "Fiber Optics," Scientific American, November 1960, pages 72–81.

TOBIAS E. LEVOW, *Primary Examiner.*